Sept. 15, 1936.  R. GUNN  2,054,318
COMPASS
Filed May 12, 1932  4 Sheets-Sheet 1

Inventor
ROSS GUNN
By
Attorneys

Sept. 15, 1936.　　　　　R. GUNN　　　　　2,054,318
COMPASS
Filed May 12, 1932　　　　4 Sheets-Sheet 2

Inventor
ROSS GUNN

Attorneys

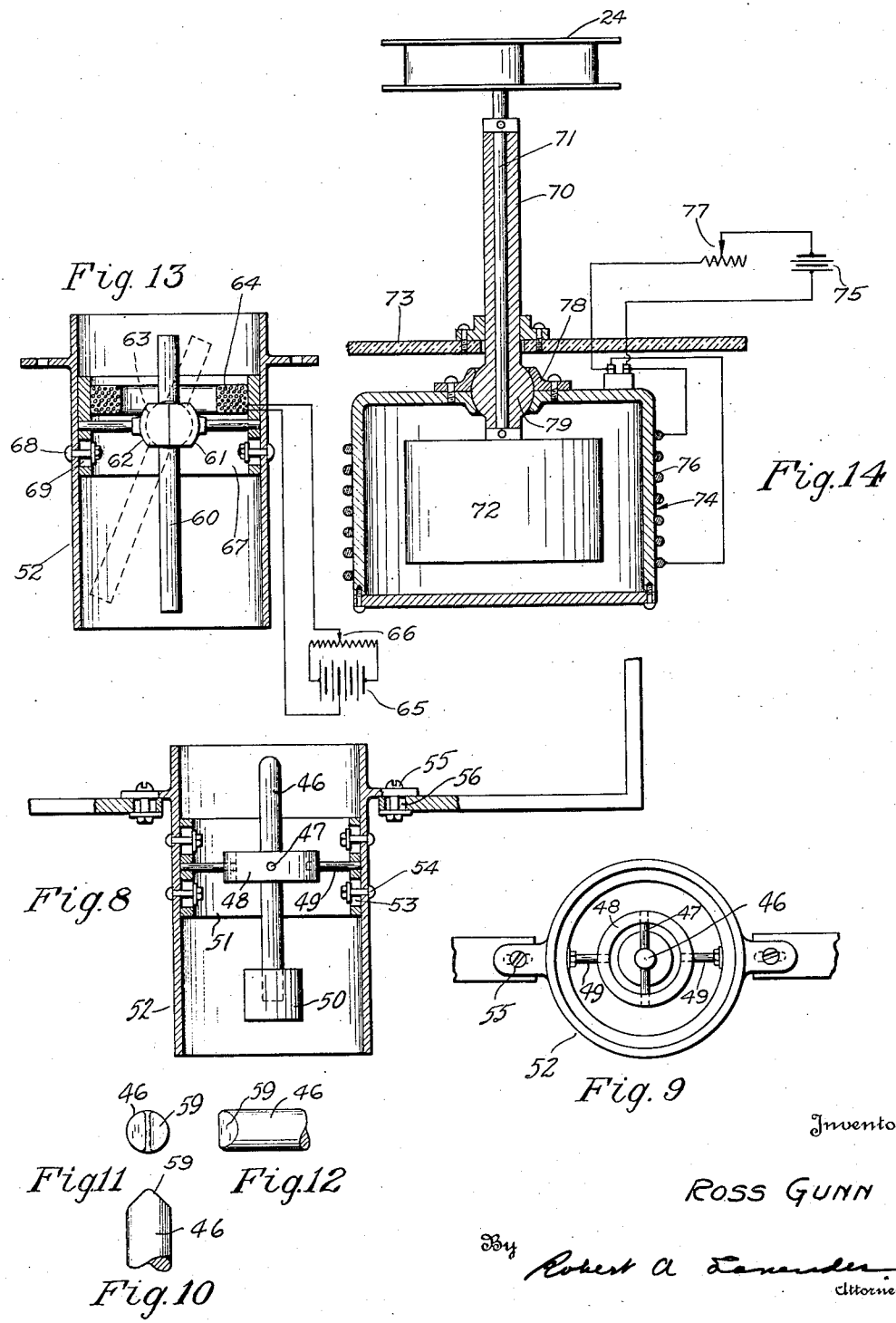

Sept. 15, 1936.  R. GUNN  2,054,318
COMPASS
Filed May 12, 1932 4 Sheets-Sheet 4
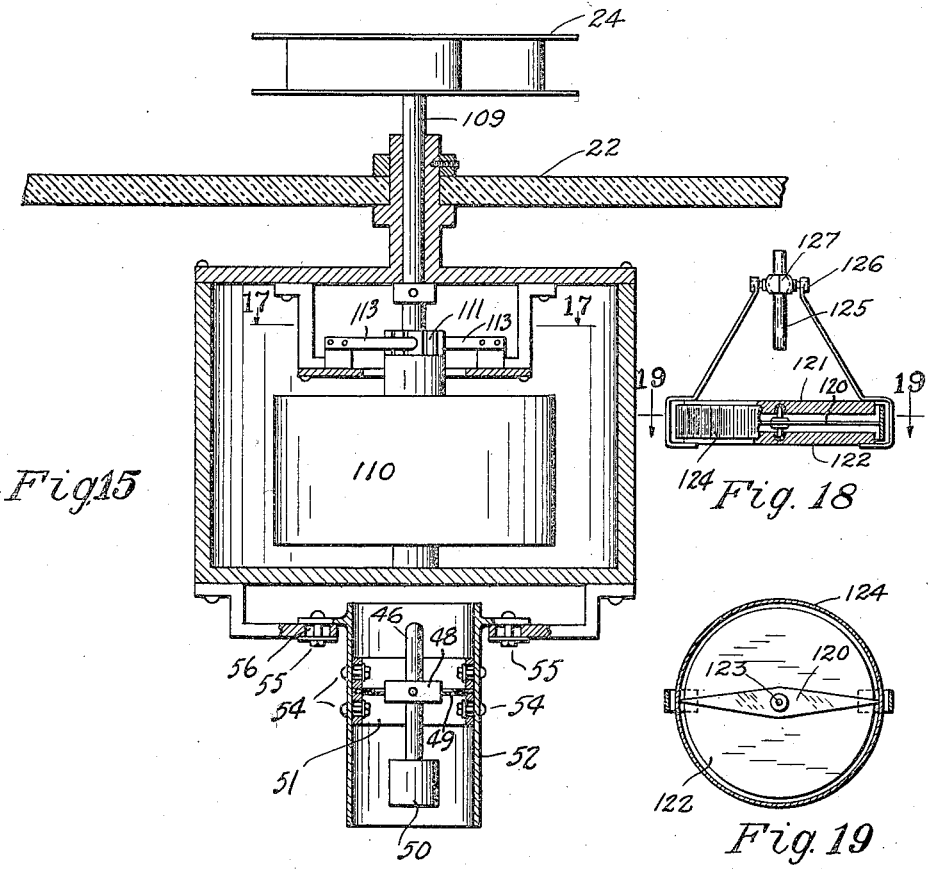
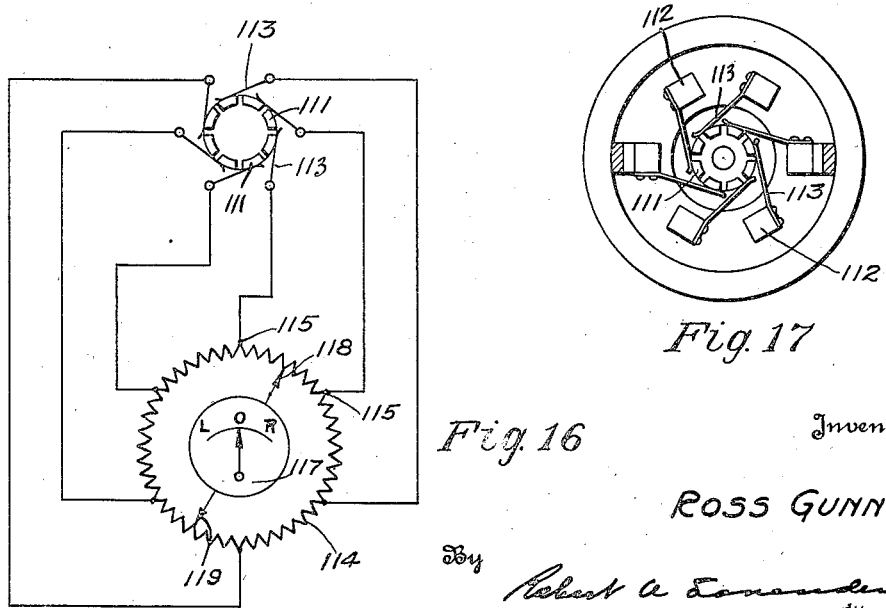
Inventor
ROSS GUNN Patented Sept. 15, 1936

2,054,318

UNITED STATES PATENT OFFICE 2,054,318

COMPASS

Ross Gunn, Washington, D. C.

Application May 12, 1932, Serial No. 610,869

9 Claims. (Cl. 33—225)

(Granted under the act of March 3, 1883, as amended April 30, 1928; 370 O. G. 757)

This invention relates to compasses, and has for an object to provide means for cancelling out spurious deviations of a magnetic compass due to the roll or pitch of the craft on which the compass is used and thus make the compass more reliable and accurate.

A particular object of the invention is to provide a compensating magnetic device capable of producing a magnetic field adjacent the responsive means of a magnetic compass mounted to turn or rotate about a fixed axis, that is, a compass rigidly mounted on the craft carrying it, and gravitationally orienting said compensating device independently of the responsive means of the compass so that it will automatically compensate for the vertical component of the earth's magnetic field or extraneous magnetic fields regardless of tipping and rocking of the craft on which the compass is mounted.

It is also an object of the invention to provide means for reducing the vertical component of the earth's magnetic field in the compass to small values, or to provide means for compensating for the extraneous E. M. F. or magnetic forces produced by the vertical magnetic field, so that this vertical component or field will have practically no effect on the indication.

Another object of the invention is to provide easily adjustable means in a compass to compensate for the permanent magnetism which an iron craft inevitably possesses, thus rendering the compass more accurate and reliable.

A further object is to provide an induction compass in which it is possible to rigidly mount all rotating parts on the craft itself, and flexible high speed universal driving means are eliminated.

Another object of the invention is to provide a rugged inductor compass in which the flexible shaft heretofore used to set the course may be entirely eliminated and the desired course selected by purely electrical means.

In short it is an important purpose of this invention to provide a simplified, more rugged and reliable inductor compass suitable for use on mobile craft, and to achieve reliability and yet retain the lightest construction possible.

Other objects and advantages will become apparent from the following description taken in connection with the accompanying drawings wherein several embodiments of the invention are shown. However, it will be understood that the invention is not limited to the details disclosed, but includes all such variations and modifications as fall within the spirit of the invention and the scope of the appended claims.

In these drawings:

Fig. 8 is an enlarged view of the compensator and the mounting therefor used in Fig. 1, the compensator being shown in elevation and the compass in vertical section;

Fig. 9 is a top plan view thereof;

Fig. 10 is a side elevation of the upper end of a compensating magnet showing its shape for a certain purpose;

Fig. 11 is a top plan view thereof;

Fig. 12 is a side elevation from the right of Fig. 10;

Fig. 13 shows a side elevation of a modified form of the compensator with its mounting in vertical section;

Fig. 14 is a partial vertical section and partial side elevation of an inductor system showing still another form of compensating device;

Fig. 15 is a partial side elevation and a partial vertical section with a different arrangement of inductor system involving a rugged inductor compass in which the flexible shaft heretofore used to set the course is entirely eliminated, and the desired course is selected by purely electrical means;

Fig. 16 is a wiring diagram for the device of Fig. 15;

Fig. 17 is a section substantially on the line 17—17 of Fig. 16;

Fig. 18 is a partial side elevation and a partial vertical section of a magnetic needle compass showing my improved compensating device applied thereto; and Fig. 19 is a transverse section substantially on the line 19—19 of Fig. 18.

Figures 1, 2, 2A, 3, 4:
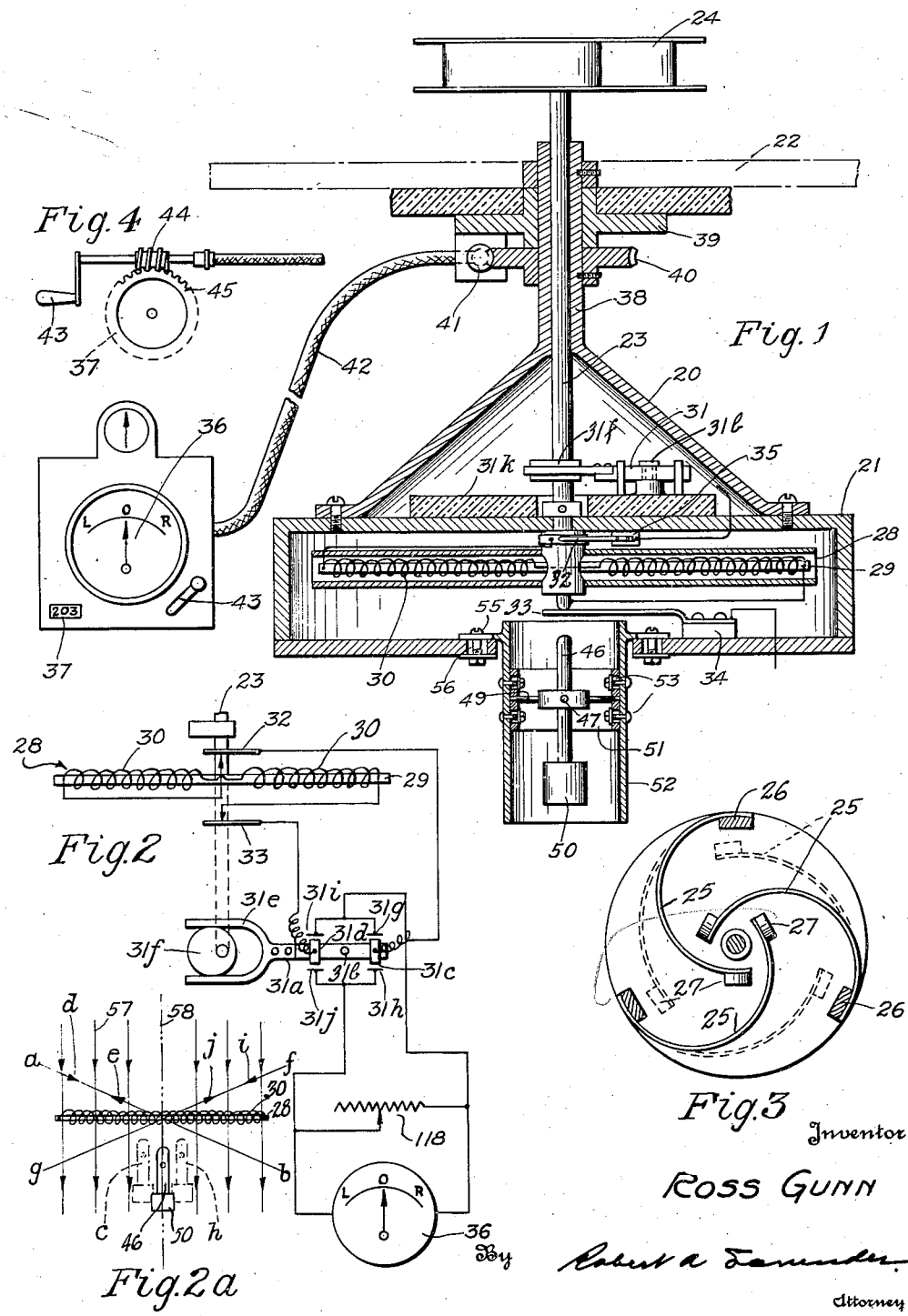
Fig. 1 is a vertical section of an inductor compass rigidly mounted on the frame of an aircraft, showing one form of my improved compensating devices applied thereto.
Fig. 2 is a schematic diagram of the device of Fig. 1 showing the electrical connections.
Fig. 2a is a diagrammatic view illustrating the effect of the compensator.
Fig. 3 is a transverse section of the propelling means which may be used for rotating the inductor of the device of Fig. 1.
Fig. 4 is a detail of a portion of the orienting device.

All magnetic compasses indicate primarily direction parallel to the surface of the earth, and hence employ for their action the horizontal component of the earth's magnetic field. The vertical component of the earth's magnetic field, which has a finite value in all regions except at the magnetic equator, contributes nothing to the action of the compass as a direction indicator. However, when the vertical component of the earth's magnetic field is present deviations of the compass needle (when magnetic needle is employed) or plane of the inductor of an inductor compass from the horizontal introduces troublesome forces and incorrect indications. If not corrected for these would occur especially when an airship rolls or pitches or when it is inclined from the horizontal in flight. To overcome these difficulties I have provided improved means either for reducing the vertical component of the earth's magnetic field in the compass to small values or to zero so that it will have practically no effect on the indication of the compass, or I have provided means for compensating for the extraneous E. M. F. or magnetic forces produced by the vertical magnetic field so that it does not affect the indication of direction.

It has been known to reduce the effect of the vertical component by mounting the compass or the inductor on gravitationally orienting supports so that as the ship pitches and rolls the inductor for example is always maintained in substantially the horizontal plane, but this has numerous disadvantages especially involving complicated and heavy mechanism for mounting the moving elements, and particularly as involving the use of a flexible high speed driving shaft. With my present system these objections are overcome as the compass and the rotating elements may be rigidly mounted on the frame of the craft, thus doing away with complicated mounting constructions and also eliminating the use of high speed flexible driving shafts and associated devices.

Referring first to Figures 1 to 4 inclusive, there is shown in these figures a simplified, more rugged, and reliable inductor compass suitable for use on mobile craft, particularly aircraft. It is so constructed as to achieve reliability and yet retain lightest construction possible. The inductor compass illustrated in certain respects is similar to that disclosed in my prior application, Serial Number 406,702, for Inductor compass, filed November 12, 1929, particularly in that it employs a breaker mechanism in place of a commutator for rectifying the current generated in order to secure stability and reliability in operation, this breaker rectifier being substantially the same as the synchronous contact mechanism disclosed in the said prior application.

This improved device comprises a support 20 and housing 21 rigidly mounted on the frame of the air craft indicated at 22. Although it is rigidly mounted on the frame it is so mounted as to be turnable about a vertical axis for orienting the inductor system for the desired course. Mounted in this frame and housing is a vertical shaft 23 driven by any suitable means, but in the present instance by a propeller or fan 24, which is mounted in the slip stream of the air craft propeller and designed to run at substantially constant speed. This propeller is shown more in detail in Fig. 3 in which is shown curved blades 25 secured at one end as shown at 26 to the supporting structure. The blades are made of some spring or flexible resilient material and are bent to a curved shape approximately as shown in the drawings. The inner ends of the blades are free and may or may not carry weights 27. It will be evident that centrifugal force may throw the weights 27 outwardly more or less depending on the speed of the fan. As the blades are straightened the driving force of the air on the blades is reduced, therefore by choosing the stiffness of the blades and the weight of the weights 27 with relation to the desired speed at which the wheel is to be operated the speed can be maintained at approximately this figure. The supports 26 may act as stops to limit the outward movement of the weights. It will be evident that this construction automatically varies with the speed of the slip stream, and to maintain the rotating speed substantially constant, as the blades form more efficient driving means when they are in the inner position shown in full lines in Figure 3 than when in the outer position as shown in the dotted lines, and therefore automatically compensate for variations in the driving force.

Mounted on the shaft 23 is the inductor 28 of any suitable type, and which may consist of a soft iron or permalloy core 29 wound with suitable conductors 30 in such a way that the rotation of the assembly 16 induces an E. M. F. in the windings of the coils due to cutting of the coils across the earth's magnetic field. The E. M. F. or current generated is conducted to the breaker mechanism indicated at 31 by the contacts 32 and 33 indicated in Figure 2, these contacts being of course insulated, as for example by mounting on insulating supports 34 and 35. From the breaker or rectifier mechanism 31 the rectified current is conducted to the indicator meter 36. The angular position of the generator structure with relation to some fixed point on the craft may be indicated by a counter 37 which is ordinarily geared to the generator in such a ratio that 360 divisions of the counter corresponds to one complete revolution. That is to say the reading can be adjusted to give the magnetic azimuth of some selected line on the craft. To accomplish this result the upright extension 38 of the housing and support 20 is mounted to turn in the bearing 39 on the frame so as to turn about the axis of the vertical shaft 23. Any suitable gearing, such as a worm gear 40 on the extension 38, and a worm 41 driven by flexible shaft 42 operated by any suitable means, such as a crank 43 located where it is easily accessible by the pilot. Counter 37 may be geared to this crank and shaft by the worm and gear 44—45 to indicate the position of the inductor system with relation to the selected line on the craft, and thus to indicate the course for which the compass is set. As is known, in this type of compass the inductor system may be turned about its axis so that the indicator 36 indicates zero when the craft is on course, and then the pointer will move to the right or left if the craft moves off course to right or left to change the relative position of the inductor to the earth's magnetic field.

It therefore indicates in what direction the craft is off course and how much.

The breaker or rectifier is indicated diagrammatically in Figure 2 as comprising a rocking arm 31a pivoted at 31b and carrying contacts 31c and 31d connected to the brushes or contacts 32 and 33. The arm has a fork 31e operated by a cam or eccentric on the shaft 23 to move the contacts 31c and 31d back and forth between the stationary contacts 31g, 31h, 31i, and 31j in synchronism with the rotation of the inductor coils 30 and thus rectify the current generated in these coils and supply the rectified current to the indicator 36. The rectifier is mounted on an insulating support 31k which may be oriented by any suitable means, not shown, to adjust it to the proper relation to the inductor.

In general, as the craft dips either fore or aft or laterally extraneous E. M. F.'s will be induced in the inductor system 28 by the vertical component of the earth's magnetic field. As indicated above a universal mounting has been used to keep the inductor assembly 16 in a horizontal plane so that the effect of the vertical component of the earth's field for any given latitude is substantially constant, but this involves a complicated mounting structure and also requires a universal or flexible high speed drive which mechanically is highly undesirable. I have overcome this difficulty with a simple compensating mechanism which consists of a magnetic means which is so mounted as to either compensate for the undesirable effects of the vertical component of the earth's magnetic field either by reducing or cancelling out this component or by compensating for the extraneous E. M. F. or magnetic forces produced by this vertical magnetic field.

Various devices may be used for accomplishing this result. In Fig. 1 the device illustrated for doing this comprises a permanent magnet 46 mounted on a gimbal or universal support, that shown comprising a horizontal pivot 47 for mounting the magnet in a ring 48 which is in turn supported by horizontal pivots 49 at right angles to the pivots 47, and therefore the magnet may swing or tip in all directions. The lower end is weighted as indicated at 50 so as to automatically maintain the unit 46 in the upright or vertical position in all positions of the aircraft. The pivots 49 are mounted on a ring support 51 in the cylinder 52 and the walls of this support have elongated slots 53 through which extend mounting bolts 54. It will be evident that by loosening these bolts the support 51 and the magnet 46 may be adjusted up and down, or that is toward and from the inductor 28 to vary the effect of the magnetic field of the compensator on the inductor. It is also desirable that the magnet in the normal position be in alignment with the axis of the shaft 23, and therefore the mounting 52 is supported so that it may be adjusted to bring the magnet into this position. Therefore the mounting bolts 55 may pass through enlarged openings or slots 56 in the bottom wall of the housing 21 to permit this adjustment.

With this arrangement the magnet 46 introduces into the compass a magnetic field which changes its magnitude and direction with changing attitude of the craft in such a manner that the compensating E. M. F. or compensating magnetic force will just cancel the effects of the vertical magnetic field. This effect is illustrated diagrammatically in Fig. 2a. Thus when the ship is on an even keel the inductor 28 is rotating in a horizontal plane and the effect of the vertical earth's magnetic field or the vertical component of the earth's magnetic field represented by the lines 57 is compensated for by a counter E. M. F. due to the field provided by the magnet 46, and due to the adjustable mounting of this magnet it will be evident that the magnet can be adjusted to cancel out the E. M. F. due to the vertical component of the earth's field, the adjustment depending on the strength of the field. If now the ship is tipped so that the inductor 28 rotates in the plane indicated by the inclined line ab, then the magnet 46 will be shifted to the position c and the E. M. F. represented by arrow d will be counterbalanced or compensated for by the E. M. F. due to counter flux e generated by the magnet. If the ship tips in the other direction so that the inductor rotates in the plane indicated by the line fg then the magnet 46 is shifted to the position h and the flux i due to the vertical component of the earth's magnetic field will be compensated for by the counter flux j created by the magnet 46. As the angular relation of the field or flux created by the magnet with respect to the rotating inductor varies with the attitude of the ship, because the magnet always remains vertical due to its being gravitationally oriented and maintains this position due to the universal mounting and the weight 50, it will be evident that the magnitude and direction of this flux changes with the attitude of the craft in such a manner that the compensating E. M. F. or compensating magnetic force will just cancel the effects of the unwanted vertical magnetic field.

To prevent rapid oscillation of the magnet due to pitching and rolling of the ship the oscillations may be damped by producing friction on its mounting pivots, such as by friction washers, or the container 52 may be closed and hold a suitable damping liquid.

Further, under certain conditions it may happen that the fore and aft magnetism of a craft is quite different in its distribution to the lateral magnetism. Good compensation may be attained under this special condition by a single magnet if the magnet pole tip is made asymmetrical in a suitable manner to differentiate the two magnetic distributions. Such a tip is shown in Figs. 10, 11 and 12. The tip 59 is asymmetrical being straight in one direction and tapered at its opposite sides in a plane at right angles thereto.

Moreover, since the earth's vertical magnetic field changes with magnetic latitude the strength of the magnet 46 or its position with respect to the inductor generator or the compass needle system should change with the magnetic latitude. This can be readily accomplished either by making the magnet a small electro magnet as indicated in Fig. 13 and varying the current through the coil 64 or by shifting the magnet with respect to the inductor generator, the magnetic needle, or both. In Figs. 1, 8 and 9 the adjustment of the compensating effect is secured by adjusting the mounting 51 toward and from the inductor or needle as described above. In Fig. 13 the compensating magnet comprises a soft iron or perm- alloy core 60 mounted for universal rocking movement on the gimbal system 61, this comprising a ball and socket 62 in which the ball 63 on the core may turn in all directions. As the lower part of the core is heavier than the upper part it will be automatically retained in the upright position. This core is surrounded by the exciting coil 64 supplied with current from any suitable battery 65, and this current may be adjusted by an adjustable resistance 66 to vary the strength of the compensating field. This magnet with its coil may be mounted on the support or sleeve 67 in a container or mounting 52 and be adjusted therein toward or from the magnetic needle or inductor system of the compass, the same as in the arrangement in Figs. 1, 8 and 9, thus giving an additional adjustment for its compensating effect. This may be accomplished by the bolts 68 passing through the elongated slots 69.

Besides the method of introducing a magnetic field which changes its magnitude and direction with changing attitude of the craft in such a manner that the compensating E. M. F. or compensating magnetic force will just cancel the effects of the unwanted vertical magnetic field, there is a method of completely neutralizing the vertical component of the earth's magnetic field in the compass. A device for this purpose is shown in Fig. 14. Here 70 represents a mounting carrying a driving wheel 24 similar to that of Fig. 1 operating an upright driven shaft 71 and carrying an inductor generator 72 mounted on the shaft to turn therewith. This arrangement is rigidly mounted on the frame of the craft proper indicated at 73. As indicated above, in the past it has been the practice to mount such an inductor generator on a universal mounting so that its axis of rotation and the shaft 71 is always maintained in the vertical position. This required a high speed, universal or flexible drive shaft which for mechanical reasons is very undesirable. With this present arrangement however, this flexible drive shaft is entirely eliminated and the device is rigidly mounted by a simple construction on the frame of the craft. In order however, to compensate for the pitch and roll of the ship the vertical component of the earth's magnetic field is reduced to zero in the rotating inductor system by the gravitational oriented electro magnet 74. For this purpose a suitable direct current is led from any suitable source, such as a battery 75 to circulate through the winding of the coil 76 in an appropriate direction to produce a magnetic field in the region of the inductor generator 55 which just cancels the vertical component of the earth's magnetic field in this inductor. The strength of the field may be varied by the adjustable resistance 77. This electro magnet is mounted on a universal mounting comprising a socket 78 and a ball 79 so that it may rock in all directions and therefore it is mounted in such a manner that the axis of the solenoid is always vertical irrespective of the position of the craft, or that is, the shaft 71 and its mounting 78. Thus in any given magnetic latitude deviations in the indications of the compass which would otherwise arise from the pitch and roll of the ship are non-existant in this device since there is no vertical magnetic field in the inductor system. The tipping of the ship will slightly reduce the induced E. M. F. produced by the inductor generator 72, but will not shift the position or direction of indication of the true course. A large permanent magnet or a system of permanent magnets gravitationally oriented will accomplish the same result, but they must be so mounted that the strength of their fields could be adjusted.

A particular advantage of this device using the types of compensator above described lies in the fact that by their use it is possible to rigidly mount all rotating parts on the craft itself and flexible high speed universal drives are eliminated. It is also to be noted that the gravitationally oriented system, that is the compensator, is at rest, and therefore there are no gyroscopic forces to throw it out of adjustment or to affect its accuracy. For this reason it is more easily damped and the compass comes to its true indication with greater rapidity than has been possible with any of the earlier designs.

Figure 5:
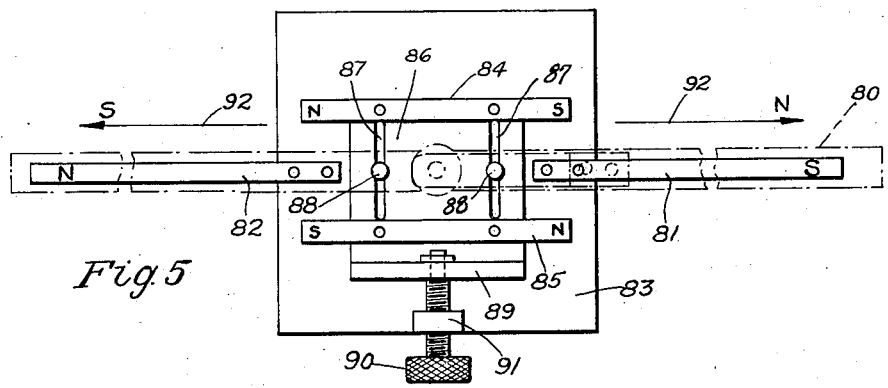
Fig. 5 is a plan view of a compensating device which may be used either with an inductor compass or may also be used with various other types of compasses to compensate for various extraneous magnetic fields, such for example as a permanent magnetism, which an iron craft inevitably possesses.
Figure 6:
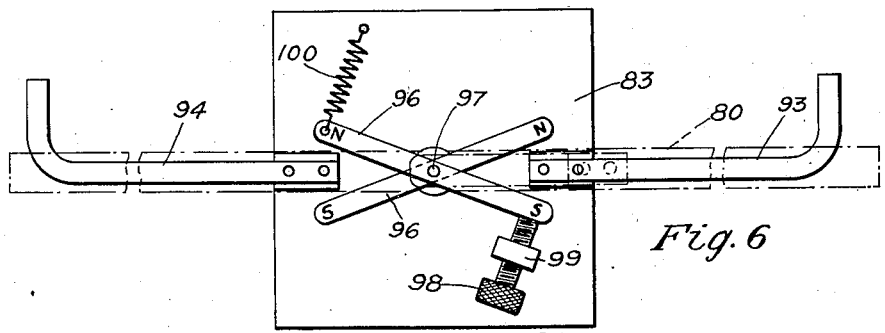
Fig. 6 is a similar view of a modified construction to be used for the same purpose as the device of Fig. 5.

The principle of my invention may also be used to compensate for the permanent magnetism which an iron craft inevitably possesses, and which affects the indication of the compass carried by the craft. In Figs. 5 and 6 are shown constructions which may be used for this purpose. They may be used with any magnetic compass, either a needle magnet or an inductor. In Fig. 5 the dot and dash lines 80 represent a rotating inductor which may correspond with the inductor 28 of Fig. 1. Located adjacent the plane of rotation of the inductor are two arms 81 and 82 of any suitable magnetic material such as soft iron, permalloy, or any other magnetic material of low cohesive force. These arms are mounted on a mounting slab 83 of any suitable material, such as bakelite or brass. These arms operate as collectors of magnetic flux. Mounted adjacent these collectors 81 and 82 are two permanent magnets 84 and 85 secured on a non-magnetic mounting 86. It will be noted that the magnets 84 and 85 are mounted on opposite sides of the collectors 81 and 82, but that they are adjustable toward and from these collectors. In the present instance the member 86 has elongated slots 87 through which are headed studs 88 mounting the member 86 on the block 83. The member 86 has a flange 89 through which is pivoted an adjusting screw 90 threaded in a lug 91 carried by the block 83. It will thus be evident that by turning the screw 90 the block 86 may be adjusted laterally with respect to the members 81 and 82 and thus the magnets 84 and 85 may be adjusted toward and from the members 81 and 82. Thus if the magnet 84 is mounted with its north pole to the left and its south pole to the right as indicated by the letters N. and S. and the magnet 85 is arranged with its north pole to the right and its south pole to the left, then the members 81 and 82 will be polarized to correspond with the magnet located closest to it. If the two magnets are located equidistant from the members 81 and 82 then they neutralize each other and the members 81 and 82 are not polarized, but if the screw 90 is adjusted to bring the magnet 84 closer to these elements then the element 81 would be of south polarity, while the element 82 would be of north polarity. If the magnets are adjusted in the opposite direction to bring the magnet 85 closer to the elements 81—82 then 81 would be of north polarity, while 82 would be of south polarity. It will also be evident that the magnitude of the flux in these elements 81—82 would depend on the degree of proximity of the magnets to these elements, and the closer either magnet is to these elements the greater the flux. Therefore it will be evident that the compensator involving the elements 81—82 and the magnets is capable of producing a magnetic field from some finite value in one direction to the same value in the opposite direction continuously by means of a simple adjustment. It will also be evident that the volume of the region compensated is comparable to the volume of the inductor or the magnetic needle system of the compass. Thus by turning the screw 90 a magnetic field may be produced at some outside point of any reasonable magnitude and direction. Therefore if the line 92 represents the permanent magnetism which the iron craft on which the compass is mounted possesses, then by adjusting the magnet 84 toward the elements 81—82 to the proper position a field will be created by these elements of suitable magnitude and direction to compensate for the field 92. In a practical arrangement two or more systems similar to Fig. 5 would be employed and these would be arranged at right angles to each other.

In Fig. 6 is a slightly different arrangement for securing the same effect. Here the collector elements 93—94 correspond to the elements 81—82 of Fig. 5 mounted adjacent the rotating inductor 80. The magnets 95 and 96 are mounted on a pivot 97 and cross each other and one of them rests against the end of an adjusting screw 98 threaded in a lug 99 on a block 83, and spring 100 tends to turn the magnet on their pivot 97 and hold the end of the magnet against the screw 98. It will be evident that by turning the screw 98 the ends of the magnets may be adjusted toward and from the elements 93—94 to polarize these elements and vary the magnitude of the flux therein the same as in the form of Fig. 5.

Figure 7:
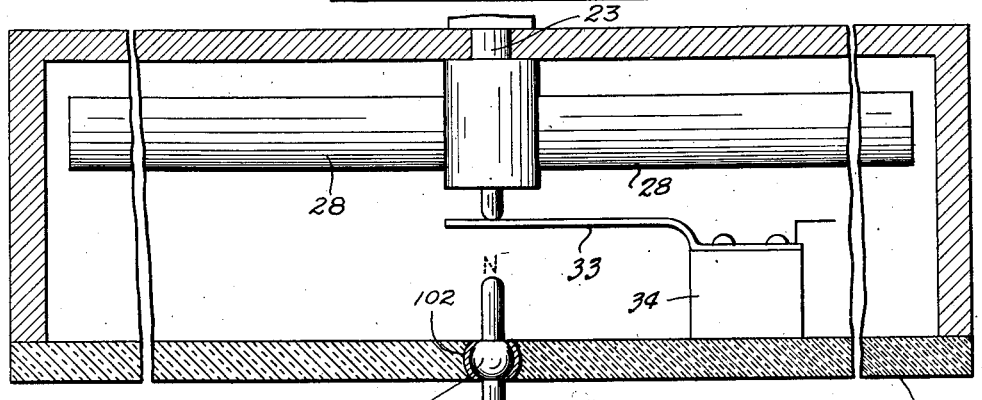
Fig. 7 is a partial side elevation and a partial section of a portion of an inductor compass, showing a modified form of compensator.

In Fig. 7 is shown a gravitationally oriented compensating device in which the polarity may be changed or its effect varied. In this figure the compensating device is shown with an inductor system corresponding to that of Fig. 1, the inductor 28 being rotated by the upright shaft 23. Mounted by a ball and socket joint 101 and 102 in the lower wall of the housing 27 is the magnetic element 103 and it is thus gravitationally oriented to swing in all directions and is maintained in the upright position in all positions of the inductor compass and of the craft on which it is mounted. Mounted on the lower part of the member 103, which may be of soft iron, permalloy or other suitable magnetic material, is a support 104 pivoted to member 103 at 105. The member 104 carries two magnets 106—107 arranged with their poles reversed as indicated. The pivot 105 may be relatively tight to provide sufficient friction to hold the element 104 in any given position, or friction means may be provided, such as a friction washer. Thus if the compass is used in a location where north polarity is desired for compensating for the vertical component of the earth's magnetic field in the compass, then the element 104 is turned on its pivot to a position indicated in the dotted lines to bring the north pole of magnet 106 adjacent to the member 103 and to move the south pole of the magnet 107 away from this element. Thus the element 103 will be polarized by the magnet 106 and the strength of its field or flux will depend on the proximity of this magnet to the element 103. A handle 108 may be provided on the member 104 to shift it to the position desired. It will also be evident that clamping or locking means may be provided to secure the element 104 in adjusted position.

In Figs. 15, 16 and 17 my compensating device is shown as applied to a somewhat different inductor compass than that shown in Fig. 1. The purpose of this arrangement is to provide a rugged inductor compass in which the flexible shaft heretofore used to set a course is entirely eliminated and the desired course is selected by purely electrical means. This improved electrical compass is based on a system by which it is possible to set the desired course by an electrical bridge system rather than by the use of a flexible shaft or other mechanical arrangement. A typical layout of this type of compass is shown in Figs. 15, 16 and 17 wherein a drive wheel 24 similar to that used in Fig. 1 is mounted on the upright shaft 109 which drives an inductor armature or coils 110.

The rotating inductor armature 110 produces an E. M. F. in its windings in the well known manner of turning in the earth's magnetic field. The armature winding may be any one of several types, but it is desirable that efficient symmetry of the windings be selected so that several commutator segments 111 can be used and connected to these windings. Instead of using two or four brushes pressing on the commutator, in this particular design it has been found more satisfactory to use a relatively large number, for the use of a greater number permits of a more uniform scale of direction. The arrangement of the brush and commutator system is shown more clearly in Figs. 16 and 17 where insulating blocks 112 carry the brushes 113 which make contact with the commutator comprising the segments 111. The electrical layout of this system is shown in Fig. 16 where the commutator and brush assembly is indicated in the upper part of the figure. A lead extends from each brush to a point indicated at 115 on a ring resistance balance circuit 114, the points of contact to this ring being symmetrical and equal to the number of brushes employed as shown in Fig. 16. The indicator mechanism indicated at 117 is shown connected across the ring resistance balance circuit 114 by sliding contacts 118—119. The sensitivity of this indicator mechanism may be controlled by a shunt in the usual manner as indicated at 118, Fig. 2.

The rotation of the inductor armature in the earth's magnetic field gives rise to an E. M. F. which depends on the relative position of the magnetic field and the brush system. As the relative position of the impressed magnetic field changes in respect to the fixed brush system, so also the relative position of high and low potential in the ring resistance balance circuit 114. Thus a point will always be found where the contacts 118—119 are at zero potential no matter what the position of the impressed magnetic field. Moreover, the position of the contacts where they are at zero and the same potential, or when the indicator 117 shows zero average current, bears a definite relation to the angular position of the earth's magnetic field to a reference axis. Such a device may therefore be employed to indicate direction and the contacts may be arranged to slide over a suitable scale with all the points of the compass marked thereon, and by so setting the contacts for a given course the pilot may judge when he is on a selected course and when he is off it, and which way he is off by simply observing the indicator 117. Thus contacts 118 and 119 may be mounted on a support to turn or slide on the ring 114 to set the desired course, and when on course is at zero E. M. F. As the craft turns in space the commutator 111 turns relative to the earth's magnetic field and the potential distribution in the ring circuit 114 changes with it and is indicated by the position of zero E. M. F.

As shown in the other devices this type of compass may be rigidly mounted on the frame 22 of the craft and the deviations introduced by the vertical component of the earth's magnetic field compensated for by any of the gravitationally oriented compensating devices previously described. In Fig. 15 the compensating device shown is the magnet 46 the same as that shown in Fig. 1. The advantage gained by being able to use a rigidly mounted inductor system is so great that the inherent low sensitivity of this type of device can be overcome by using large inductor systems, yet maintaining the total weight at suitable values. It will be clear that the compensation of the vertical component of the earth's magnetic field may be accomplished either by the permanent magnets or by means of an electromagnet which is gravitationally oriented as well as by the small permanent magnet compensator.

In Figs. 18 and 19 is shown how this compensator for the vertical component of the earth's magnetic field may be used with a needle magnet compass. In this particular arrangement the compensator is shown as mounted above the needle, but it may of course be mounted below it. In these figures the magnet of the fixed needle type compass indicated at 120 is swung between two heavy copper or aluminum plates 121 and 122 on the pivots 123 to provide electrodynamic damping. It will be evident that movement of the magnet would induce eddy currents in these plates to produce the damping effect. A circular scale 124 may be attached to the needle and graduated to read from zero to three hundred and sixty degrees. The gravitationally oriented compensator 125 is mounted on the supports 126 on the ball and socket 127 the same as in the other figures, the compensator 125 being either a permanent or an electromagnet and heavier below this support so that it is always maintained in an upright position.

It will be evident that I have provided an effective means for compensating for the effects of the vertical component of the earth's magnetic field as the ship pitches or rolls out of the horizontal plane, and that it may be applied to all magnetic compasses involving either a permanent magnet needle or a rotating inductor system, and that it is much simpler and more easily mounted and operated than the old system where the entire system is gravitationally oriented.

The preferred embodiment is that disclosed in Figs. 1, 2a, 7 to 15 inclusive, 18 and 19 comprising a magnetic means gravitationally oriented independently of the means responsive to the earth's magnetic field so that this compensating means can be used with compasses normally mounted in a fixed position on a mobile craft.

The invention described herein may be manufactured and used by or for the Government of the United States of America for governmental purposes without the payment of any royalties thereon or therefor.

Having thus set forth the nature of my invention, what I claim is:

1. In a compass, means responsive to the earth's magnetic field to indicate direction and mounted on a mobile craft to turn about an axis arranged in a normally fixed position relative to said craft so that said axis tips with the craft and is maintained in the same relative position with respect thereto, a device mounted adjacent said responsive means capable of creating a magnetic field to cancel out the effect of the vertical component of the earth's magnetic field, means for mounting said device for universal swinging movements, and gravitationally controlled means for stabilizing said device in an upright position independently of movements of the craft.

2. In a compass, an inductor system, means for rigidly mounting the inductor system on a mobile craft to rotate about an axis which is fixed relative to the craft and normally substantially vertical, a compensating magnetic device adjacent the inductor, a universal mounting for said device permitting universal rocking movement, and said device being pendulous in said mounting so that it is gravity operated to automatically maintain the device in substantially the vertical position as the craft tips in various directions to cancel out the effect of the vertical component of the earth's magnetic field only.

3. In a compass, an inductor system, means for rigidly mounting the inductor system on a mobile craft to rotate about a normally substantially vertical axis fixed relative to the craft so that it tips with the craft, a vertical compensating magnetic device adjacent the inductor, means mounting the compensating device for universal swinging movements, said device being pendulous in said mounting, and means for mounting the compensating device to permit adjustment of the device toward and from the inductor to vary the effect of said device on the system.

4. In a compass, an inductor system including an inductor mounted to rotate about a normally upright axis, means for rigidly mounting the system on a mobile craft with said axis fixed relative to the craft, a compensating magnet located in a substantially vertical position adjacent said inductor, means for mounting the magnet for universal rocking movement in all directions independently of the inductor and said magnet being weighted so that it is automatically maintained in the substantially vertical position by gravity.

5. In a compass, means responsive to the earth's magnetic field to indicate direction, aligned elements of magnetic material located adjacent said means and forming a gap between adjacent ends, a pair of polarizing magnets arranged on opposite sides of said elements and with their poles in reversed relation with respect to said elements, and means for shifting the magnets toward and from the elements to bridge said gap to vary the polarization of the elements.

6. In a compass, the combination of an inductor system rigidly mounted on a mobile craft and including an inductor element rotating about an axis normally substantially vertical and fixed relative to the craft so as to tip with said craft, a magnetic device capable of producing a magnetic field adjacent the inductor to cancel out the effect of the vertical component of the earth's magnetic field only, means mounting the magnetic device for universal swinging movements, and said device being pendulous in the said mounting for gravitationally stabilizing said device independently of the inductor as the craft tips.

7. In a compass, inductor means responsive to the earth's magnetic field to indicate direction mounted on a mobile craft to turn about a normally substantially vertical axis, which axis is fixed relative to the craft so as to tip with said craft, a magnetic device capable of producing a magnetic field adjacent said responsive means to cancel the effect of the vertical component of the earth's magnetic field only, means mounting the magnetic device for universal swinging movements, and said device being pendulous in said mounting for gravitationally stabilizing said device independently of the responsive means as the craft tips.

8. In a compass, an inductor system, means for rigidly mounting the inductor system on a mobile craft, a compensating magnet, means mounting the magnet for universal swinging movements with one end adjacent said system and the other end remote therefrom, said magnet being pendulous in said mounting, and said end of the magnet being asymmetrical so it has an end oblong in cross section to produce a stronger magnetic field in one plane than in others at an angle thereto to compensate for the asymmetrical magnetism of the craft.

9. In a compass, an inductor system, means for rigidly mounting the inductor system on a mobile craft, a compensating magnet, means mounting the magnet for universal swinging movements with one end adjacent said system and the other end remote therefrom, said magnet being pendulous in said mounting, and said end of the magnet being asymmetrical so it has an oblong end to produce a stronger magnetic field in one plane than in others at an angle thereto to compensate for the asymmetrical magnetism of the craft.

ROSS GUNN.